United States Patent
Lee

(10) Patent No.: US 6,463,175 B1
(45) Date of Patent: Oct. 8, 2002

(54) STRUCTURE-GUIDED IMAGE PROCESSING AND IMAGE FEATURE ENHANCEMENT

(76) Inventor: Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 40 days.

(21) Appl. No.: 09/738,846

(22) Filed: Dec. 15, 2000

(51) Int. Cl.[7] ................................................. G06K 9/46
(52) U.S. Cl. ...................................... 382/190; 382/266
(58) Field of Search ................................ 382/191–194, 382/199–200, 266–269

(56) References Cited

U.S. PATENT DOCUMENTS

| | | | |
|---|---|---|---|
| 5,315,700 A | | 5/1994 | Johnston et al. |
| 5,359,433 A | * | 10/1994 | Nagase et al. ............... 358/298 |
| 5,398,292 A | * | 3/1995 | Aoyama ...................... 382/199 |
| 6,046,821 A | * | 4/2000 | Curry .......................... 358/1.9 |
| 6,122,397 A | | 9/2000 | Lee et al. |
| 6,130,967 A | | 10/2000 | Lee |
| 6,148,099 A | | 11/2000 | Lee et al. |
| 2001/0041018 A1 | * | 11/2001 | Sonoda ....................... 382/275 |

OTHER PUBLICATIONS

1. Lee, JSJ, Haralick, RM and Shapiro, LG, "Morphologic Edge Detection", IEEE Journal of Robotics and Automatiuon, vol. RA–3 No. 2:142–156 Apr., 1987.

2. Haralick, RM and Shapiro, LG, "Survey Image Segmentation Techniques", Computer Vision, Graphics, and Image Processing, vol. 29, No. 1: 100–132 Jan. 1985.

3. Otsu, Nobuyuki, "A Threshold Selection Method from Gray–Level Histograms", IEEE Transactions on Systems, Man, and Cybernetics, vol. SMC–9, No. 1:62–66 Jan. 1979.

4. Serra, J., "Image Analysis and Mathematical Morphology", London: Academic Press, 319–321, 1982.

5. Sternberg, Stanley R., "Grayscale Morphology", Computer Vision, Graphics, and Image Processing, vol. 35, No. 3:333–355, Sep. 1986.

* cited by examiner

*Primary Examiner*—Thomas D Lee
*Assistant Examiner*—Stephen Brinich

(57) ABSTRACT

A structure guided image processing system uses geometric structure information to guide image feature extraction and enhancement of an input image to produce a weight image output and a mask image output. Geometric structure information may be apparent in the nature of the images, or it can in many cases be derived from CAD information. Idempotent processing and filtering operations minimize image distortion. Directional elongated structuring elements provide structure-guided selective processing and high speed filtering throughput.

7 Claims, 12 Drawing Sheets

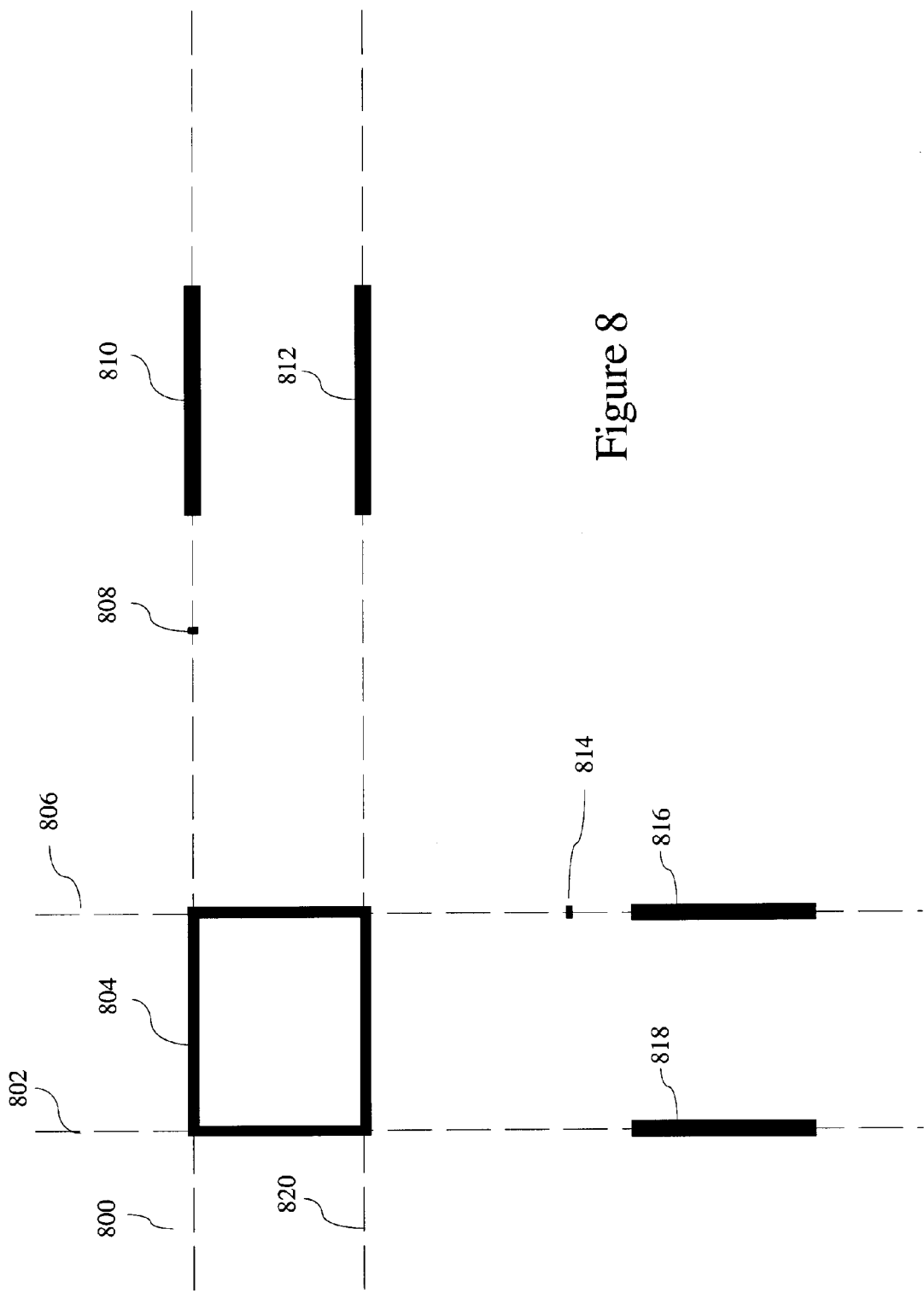

Structuring Element A

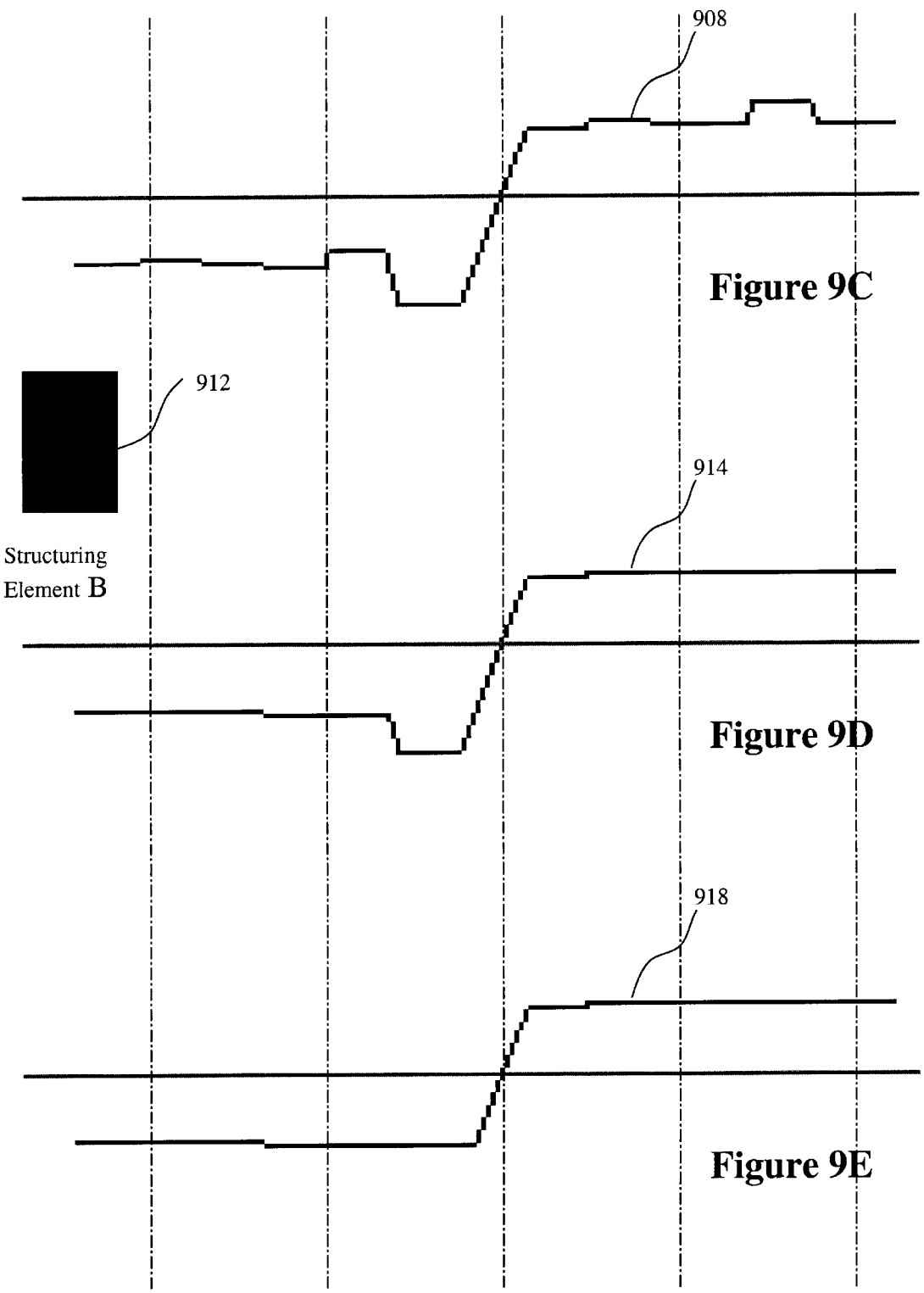

STRUCTURE-GUIDED IMAGE PROCESSING AND IMAGE FEATURE ENHANCEMENT

U.S. PATENT REFERENCES

1. U.S. Pat. No. 5,315,700 entitled, "Method and Apparatus for Rapidly Processing Data Sequences", by Johnston et. al., May 24, 1994
2. U.S. Pat. No. 6,130,967 entitled, "Method and Apparatus for a Reduced Instruction Set Architecture for Multidimensional Image Processing", by Shih-Jong J. Lee, et. al., Oct. 10, 2000
3. Pending application Ser. No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997
4. U.S. Pat. No. 6,122,397 entitled, "Method and Apparatus for Maskless Semiconductor and Liquid Crystal Display Inspection", by Shih-Jong J. Lee, et. al., Sep. 19, 2000
5. U.S. Pat. No. 6,148,099 entitled, "Method and Apparatus for Incremental Concurrent Learning in Automatic Semiconductor Wafer and Liquid Crystal Display Defect Classification", by Shih-Jong J. Lee et. al., Nov. 14, 2000

CO-PENDING U.S. PATENT APPLICATIONS

1. U.S. patent application Ser. No. 09/693,723, "Image Processing System with Enhanced Processing and Memory Management", by Shih-Jong J. Lee et. al, filed Oct. 20, 2000
2. U.S. patent application Ser. No. 09/693,378, "Image Processing Apparatus Using a Cascade of Poly-Point Operations", by Shih-Jong J. Lee, filed Oct. 20, 2000
3. U.S. patent application Ser. No. 09/692,948, "High Speed Image Processing Apparatus Using a Cascade of Elongated Filters Programmed in a Computer", by Shih-Jong J. Lee et. al., filed Oct. 20, 2000
4. U.S. patent application Ser. No. 09/703,018, "Automatic Referencing for Computer Vision Applications", by Shih-Jong J. Lee et. al, filed Oct. 31, 2000
5. U.S. patent application Ser. No. 09/702,629, "Run-Length Based Image Processing Programmed in a Computer", by Shih-Jong J. Lee, filed Oct. 31, 2000
6. U.S. Patent Application entitled, "Structure-guided Image Measurement Method" by Shih-Jong J. Lee et. al., filed Dec. 15, 2000.

REFERENCES

1. Lee, J S J, Haralick, R M and Shapiro, L G, "Morphologic Edge Detection," IEEE Journal of Robotics and Automation RA-3 No.2:142–56, April, 1987.
2. Haralick R M and Shapiro, L G, "Survey Image Segmentation Techniques," Comput. Vision, Graphics, and Image Processing, vol. 29 No. 1: 100–132, January 1985.
3. Otsu N, "A Threshold Selection Method from Gray-level Histograms," IEEE Trans. System Man and Cybernetics, vol. SMC-9, No. 1, January 1979, PP 62–66.
4. Serra, J, "Image Analysis and Mathematical Morphology," London: Academic Press, pp 319–321, 1982.
5. Sternberg, S R, "Grayscale Morphology," Comput. Vision, Graphics, and Image Processing, vol. 35 No. 3: 333–355, September 1986.

TECHNICAL FIELD

This invention relates to image processing methods that incorporate knowledge of object structure derived from the image itself or from a-priori knowledge of an object's structural relationships from its design data (such as CAD drawings) to enhance object features and/or guide image measurement estimation and object detection.

BACKGROUND OF THE INVENTION

Common tasks in computer vision applications include enhancement and detection of objects of interest, refinement of detected object masks, and measurement, alignment or classification of the refined object. Other applications include enhancement for image compression or image highlighting for display. Many computer vision applications require the enhancement and measurement of image features for objects of interest characterization or detection. Application domain knowledge is available in most computer vision applications. The application domain knowledge can often be expressed as structures of image features such as shaped color, edges, lines and regions, or changes with time such as object motion on a prescribed path. The structures include spatial relationships of object features such as shape, size, intensity distribution, parallelism, co-linearity, adjacency, position, etc. The structure information can be particularly well defined in industrial applications such as semiconductor, electronic or machine part inspections. In machine part inspections, most of the work-pieces have available Computer Aided Design (CAD) data that specifies CAD components as entities (e.g. LINE, POINT, 3DFACE, 3DPOLYINE, 3DVERTEX, LINE, POINT, 3DFACE, 3DPOLYLINE, 3DVERTEX, etc.) and blocks (properties that are associated) of entities. Semiconductor applications frequently have step and repeat type processes that form lines, patterns, and mosaic structures. In biomedical or scientific applications, structure information may also be loosely defined. For example, a cell nucleus is generally round, frequently stains dark, and different but known approximate shapes can differentiate different types of blood cells or chromosomes.

The capability of a computer vision system is often characterized by its detection/measurement accuracy, repeatability and throughput. It is desirable to achieve sub-pixel measurement accuracy and repeatability for many computer vision applications. Application domain knowledge used according to this invention can significantly improve the capability of a computer vision system to make accurate and repeatable measurements. However, it is non-trivial to efficiently use the application domain knowledge in high precision applications.

PRIOR ART

Prior art uses an image segmentation approach for image feature detection or measurement (Haralick R M and Shapiro, L G, "Survey Image Segmentation Techniques", Comput. Vision, Graphics, and Image Processing, vol. 29 No. 1: 100–132, January 1985). The image segmentation approach converts a grayscale image into a binary image that contains object of interest masks. Binary thresholding is a common technique used in the image segmentation approach to create masks.

Because edges or features of an image are imaged by the optical and imaging system as continuously varying gray levels, there exists no single gray level that represents edge pixels. For this reason, any system that depends on taking a binary threshold of the image before critical dimensions are determined must necessarily introduce quantization errors into the measurement. Binary thresholding also exacerbates the resolution limiting effect of system noise.

Prior art applies application domain structure information through a projection/dispersion approach. The projection/dispersion approach integrates image pixel values in a pre-defined direction in the image. This can be done using a binary image (projection) or grayscale image (dispersion) and results in a one-dimensional plot of summed pixel values. The application domain structure information defines the projection directions, however misalignments, variations in illumination, and image noise limit the resolving capability of these projections. The prior art approach is sensitive to system variations such as rotation, object illumination, changes in object surface texture (which affects gray levels), etc. Rotation errors result in the integration of pixel values along a wrong direction that is destructive to accuracy. Furthermore, the projection-based approach cannot effectively combine multiple two-dimensional structure information (such as anti-parallelism, orthogonality, intersection, curvaceous qualities) where features of interest may be along different directions or complex. Another difficulty in the prior art is that two-dimensional processing is needed for reliable sub-pixel accuracy due to the utility of using as many pixels as possible for the measurement. Use of all possible pixels minimizes spatial quantization errors and also aids reconstruction and interpolation between sample values. Herein there are two difficulties, the prior art does not take advantage of all pixels whose position is related, the prior art confuses image surface information and image edge information through the use of projection, and the projections cannot be used effectively with complex structures. Where the prior art could have employed two dimensions to achieve a better result (but not a projection result), such grayscale processing is in the prior art computationally demanding and requires expensive and extensive special hardware to achieve desired throughput. Additionally, in an effort to enhance image features and thereby improve measurement signal to noise or object detection or classification accuracy, prior art uses linear filters. Linear filters are derived from a digital signal processing paradigm where structure information is considerably less obvious. Linear filters are not designed to input structure information and therefore cannot utilize application domain structure knowledge. Where linear filters have been used in the prior art for feature enhancement, their own characteristics obscure essential image characteristics because they introduce phase delay distortion that causes image blur, under-shoot, over-shoot or ringing and edge displacement. These image distortions increase uncertainty of feature measurement. Image variability and noise in conjunction with prior art linear filtering and thresholding seriously degrade measurement reliability and accuracy.

OBJECTS AND ADVANTAGES

It is an object of this invention to provide improved image feature extraction, and feature enhancement through a structure-guided image processing method. It is another object of the invention to enhance image features through use of nonlinear image processing that does not introduce phase shift and/or blurry effect (transient aberration). A further object of the invention is to provide methods for utilizing application domain knowledge encoded into the image processing parameters for structure-guided extraction and enhancement of features of interest and/or to remove noisy or irrelevant information. It is a further object of the invention to create an object mask image output from the structure guided image feature enhanced image. A further object is to provide a weight image output derived from the structure guided image feature enhanced image. The weight image output and/or the mask image outputs can be used for image compression, highlighting and display of an image, measurement of objects within the feature enhanced image, or object detection.

SUMMARY OF THE INVENTION

Structure guided morphological processing uses a-priori geometric structure information to tailor or optimize the structuring elements used to extract image features of particular interest to the module. Structure-guided morphological processing involves a variety of morphological operations with various size and shaped structuring elements, that, once applied to the image, highlight specific shape or position features that are of particular importance to the function of the algorithm. This invention seeks to provide high performance image feature extraction and enhancement through a structure-guided image processing method.

BRIEF DESCRIPTION OF THE DRAWINGS

FIG. 3A shows an input ramp edge image: I

FIG. 3B shows structuring element: A

FIG. 3C shows eroded image: I⊖A

FIG. 3D shows erosion residue: I–I⊖A

FIG. 8 shows examples of structure-guided dark line extraction that extracts horizontal lines and vertical lines using directional elongated structuring elements

FIG. 9D shows the result of another opening operation using structuring element B on the result shown in FIG. 9C to produce a new result.

FIG. 9E shows the result of a closing operation using structuring element B on the result shown in FIG. 9D to produce the final result

DETAILED DESCRIPTION OF THE INVENTION

This invention provides sub-pixel, high performance image feature extraction and enhancement through a structure-guided image processing method. The processing involves two-dimensional, full grayscale processing that can be implemented efficiently and cost-effectively. The image processing does not introduce phase shift and/or blurry effect. In a structure-guided image processing method, application domain knowledge is encoded into the parameters for structure-guided extraction and enhancement of features of interest and removal of noisy and irrelevant information.

I. Structure-guided Image Processing System

Figure 1:
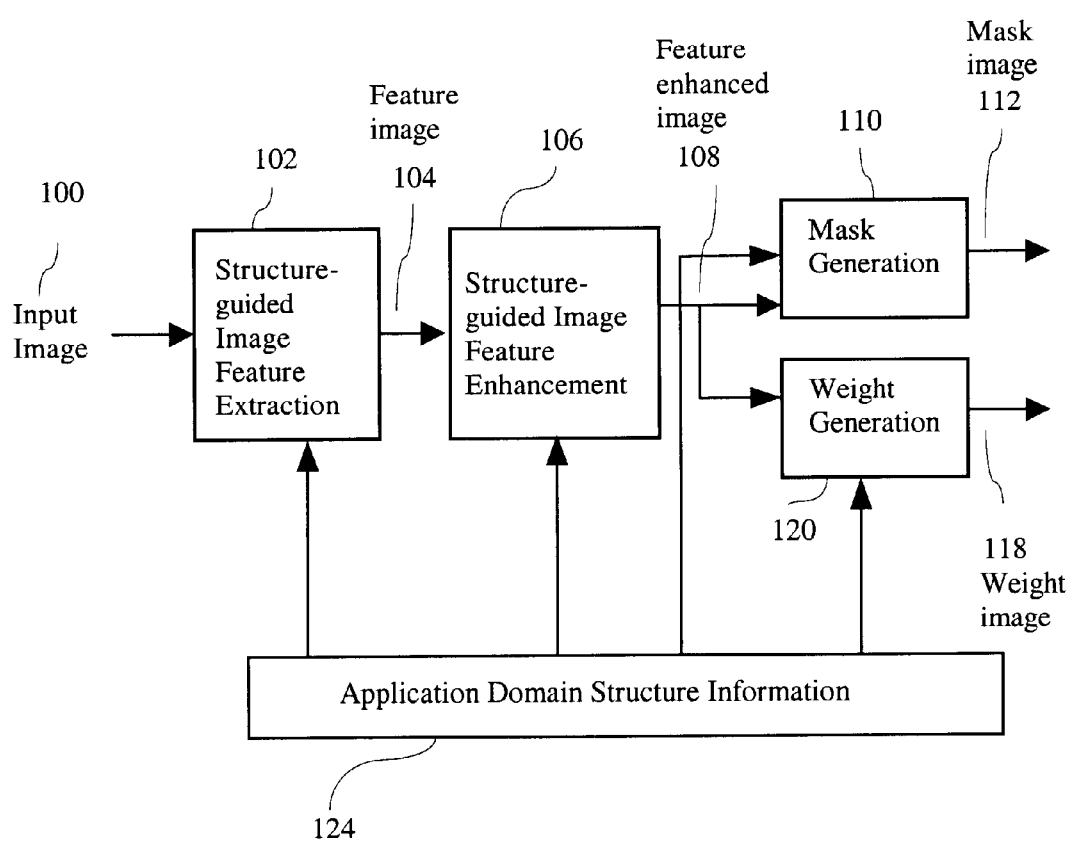
FIG. 1 shows a structure-guided image measurement system.
Figure 2:
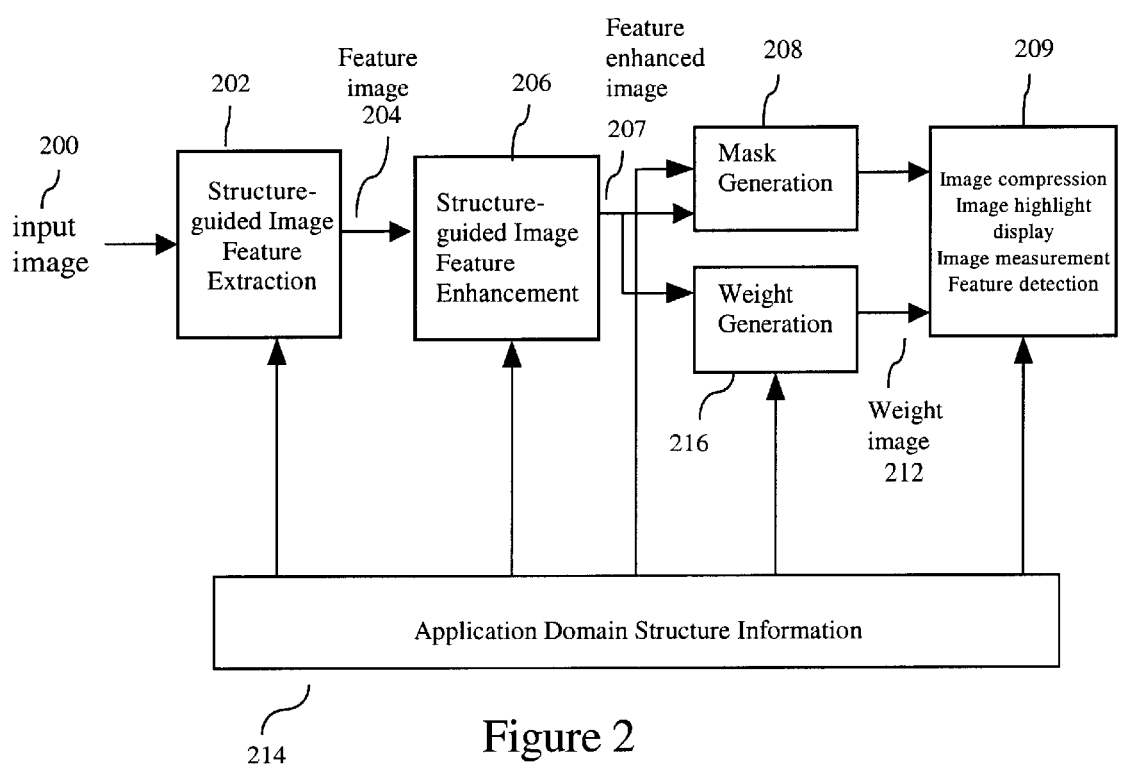
FIG. 2 shows a structure-guided detection system.

FIG. 1 and FIG. 2 show the processing flows of two application scenarios of this invention. FIG. 1 shows a structure-guided image mask generation and image weight generation system and FIG. 2 shows applications for the outputs of the system described in FIG. 1.

As shown in FIGS. 1 and 2, the input image 100, 200 is processed by a structure-guided image feature extraction module 102, 202 to extract image features of interest 104, 204. The image feature extraction module may not be needed if the desired image features are already presented in the input image. A structure-guided image feature enhancement module 106, 206 enhances the image features. The feature-enhanced image is the input for a mask generation module 110, 208 and a weight generation module 120, 216. The mask generation module 110, 208 generates masks containing features of interest 112 and uniquely labels each connected component of the masks for follow-on processing, image compression or display/highlight. The weight generation module generates a grayscale weight image 118,212. The weights correspond to the strength of the features of interest in the image. FIG. 2 shows the applications that can be accomplished with the image feature mask(s) and the weight image. These outputs are used for image compression, image display highlighting, image measurement, and/or feature detection. The detailed description for an image measurement embodiment is disclosed in co-pending U.S. patent application entitled, "Structure-guided Image Measurement Method" by Shih-Jong J. Lee et. al., filed Dec. 15, 2000 which is incorporated in its entirety herein.

II. Structure-guided Image Feature Extraction

Image features are characterized by their grayscale (or color) intensity distributions and their spatial (or temporal) structures. Major image features include linear features such as bright edge, dark edge, general edge, bright line, dark line and general line. Major image features also include image regions such as bright region, dark region and general region, etc. Linear features can be arranged vertically, horizontally, and/or in different spatial directions. Regions can exhibit different shapes such as circular or rectangular, etc. They can be arranged in a given structure including relative locations, orientation or symmetry. Other image features include small regions or points such as corners of regions or intersection points of different features (linear features and/or regions).

The structure-guided image feature extraction system 102 of this invention efficiently extracts image features of interest and removes noisy and irrelevant information. In one embodiment of this invention, this is accomplished by a sequence of grayscale morphological processing that encodes structure information into directional elongated structuring elements that can be efficiently implemented using a general purpose computing platform (co-pending patent applications entitled "U.S. patent application Ser. No. 09/693,723, "Image Processing System with Enhanced Processing and Memory Management", by Shih-Jong J. Lee et. al, filed Oct. 20, 2000 and U.S. patent application Ser. No. 09/692,948, "High Speed Image Processing Apparatus Using a Cascade of Elongated Filters Programmed in a Computer", by Shih-Jong J. Lee et. al., filed Oct. 20, 2000).

II.1 Feature Extraction Processing Sequence

This section describes some feature extraction processing sequences in the preferred embodiment of the invention.

Bright Edge Extraction

Figure 3:
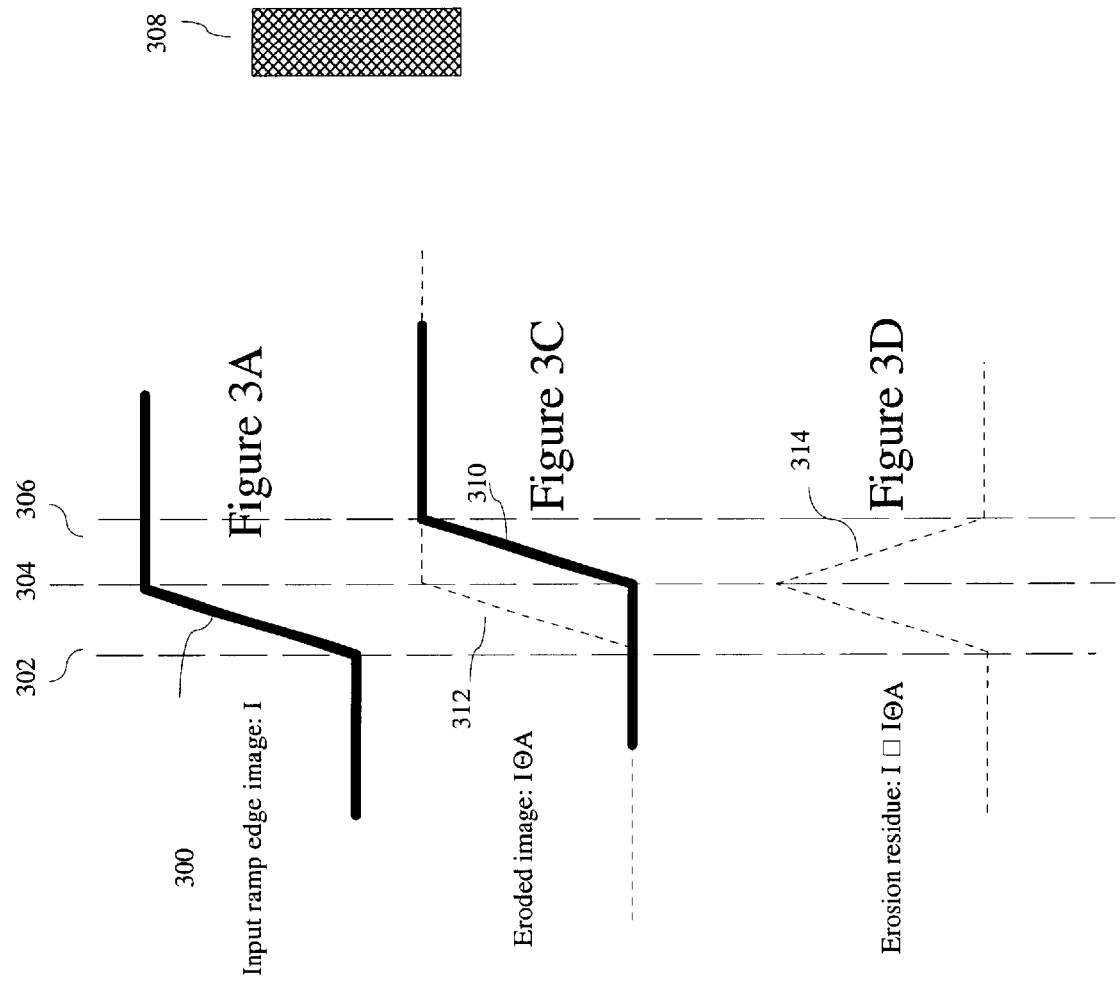
FIG. 3 shows bright edge extraction by grayscale morphological erosion residue.

In a preferred embodiment, bright edges are extracted by a grayscale erosion residue processing sequence defined as:

$$I-I\Theta A$$

Where I is an input image, A is a structuring element and $\Theta$ is the grayscale morphological erosion operation (Sternberg, S R, "Gray-scale morphology," Comput. Vision, Graphics Image Processing, vol. 35: 333–355, 1986). FIGS. 3A, 3B, 3C, 3D illustrate the grayscale erosion residue operation applied to a one dimensional grayscale ramp edge I 300 shown in FIG. 3A. FIG. 3B shows the structuring element A 308 and FIG. 3C shows image I 300 eroded by A 308 resulting in eroded image 310. The erosion residue result 314 is shown in FIG. 3D. Spatial alignment marks 302, 304, 306 show the position shifts that occur as a result of erosion and erosion residue operations. Notice that the original image I has its increase starting at 302 and ending at 304. By use of an appropriately sized structuring element A shown in 308, an eroded image result 310 is displaced an amount equal to the structuring element size. In this example I 310 has been displaced and now begins at position 304. An erosion residue result:

$$I-I\Theta A$$

shown as 314 in FIG. 3D, demonstrates that grayscale morphological bright edge detection may not introduce undesired phase shift, group envelope delay distortion or blurry effect (transient aberration) normally caused by linear filters and the position and size or shape of image features can remain undisturbed, thus enhancing image features.

Dark Edge Extraction

Figure 4:
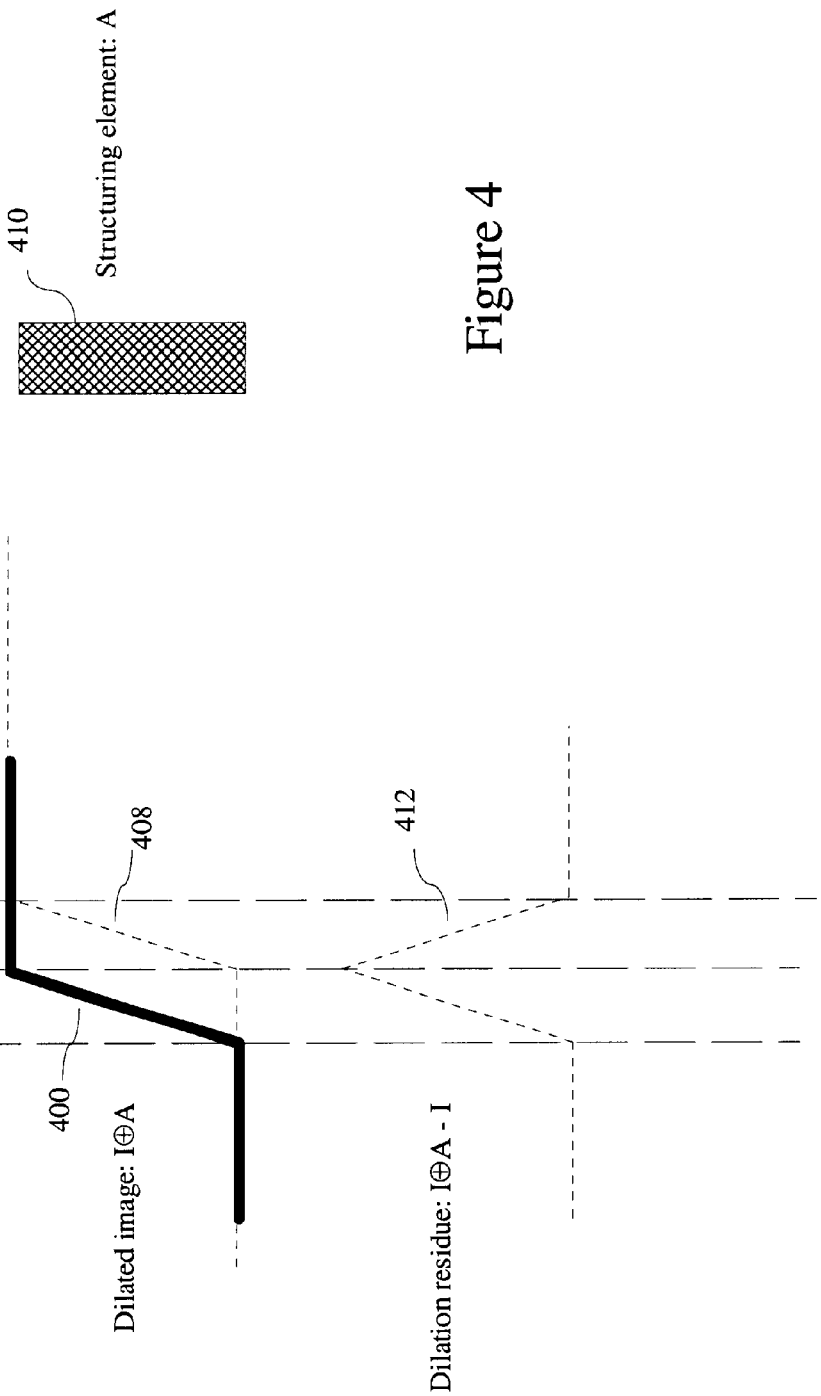
FIG. 4 shows dark edge extraction by grayscale morphological dilation residue.

In the preferred embodiment, Dark edges are extracted by a grayscale dilation residue processing sequence defined as:

$$I\oplus A-I$$

Where $\oplus$ is the grayscale morphological dilation operation (Sternberg, S R, "Gray-scale morphology," Comput. Vision, Graphics Image Processing, vol. 35: 333–355, 1986). FIG. 4 illustrates the grayscale erosion residue operation applied to the one-dimensional ramp edge 408. FIG. 4 shows the result 400 of dilating image I 408 by structuring element A 410. The dilation residue result 412 is also shown in FIG. 4. As shown in FIG. 4, grayscale morphological dark edge detection with a selected structuring element does not introduce undesired phase shift or blurry effect (transient aberration).

General Edge Extraction

General edges (both dark and bright edges) can be extracted by the difference of grayscale dilation and erosion defined as:

$$I\oplus A-I\Theta A$$

Figure 5:
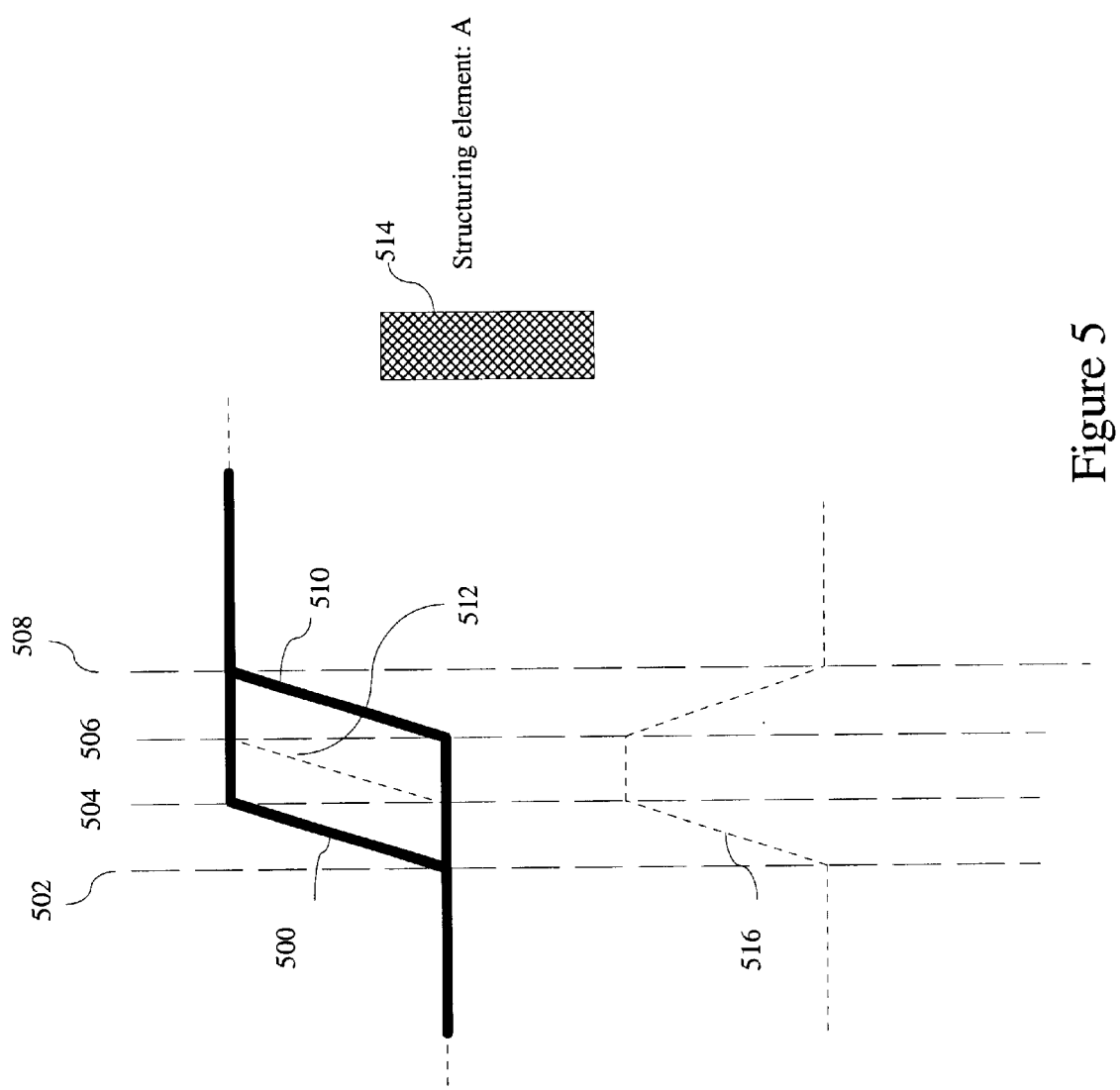
FIG. 5 shows general edge extraction by difference of grayscale dilation and erosion.

FIG. 5 illustrates the one dimensional ramp edge I, 512, the grayscale dilation result of I by the structuring element A 514, 500, and the gray scale erosion of I by A result 510. The difference of grayscale dilation and erosion result is 516. As shown by 516, grayscale morphological edge detection does not introduce undesired phase shift or blurry effect.

Figure 6:
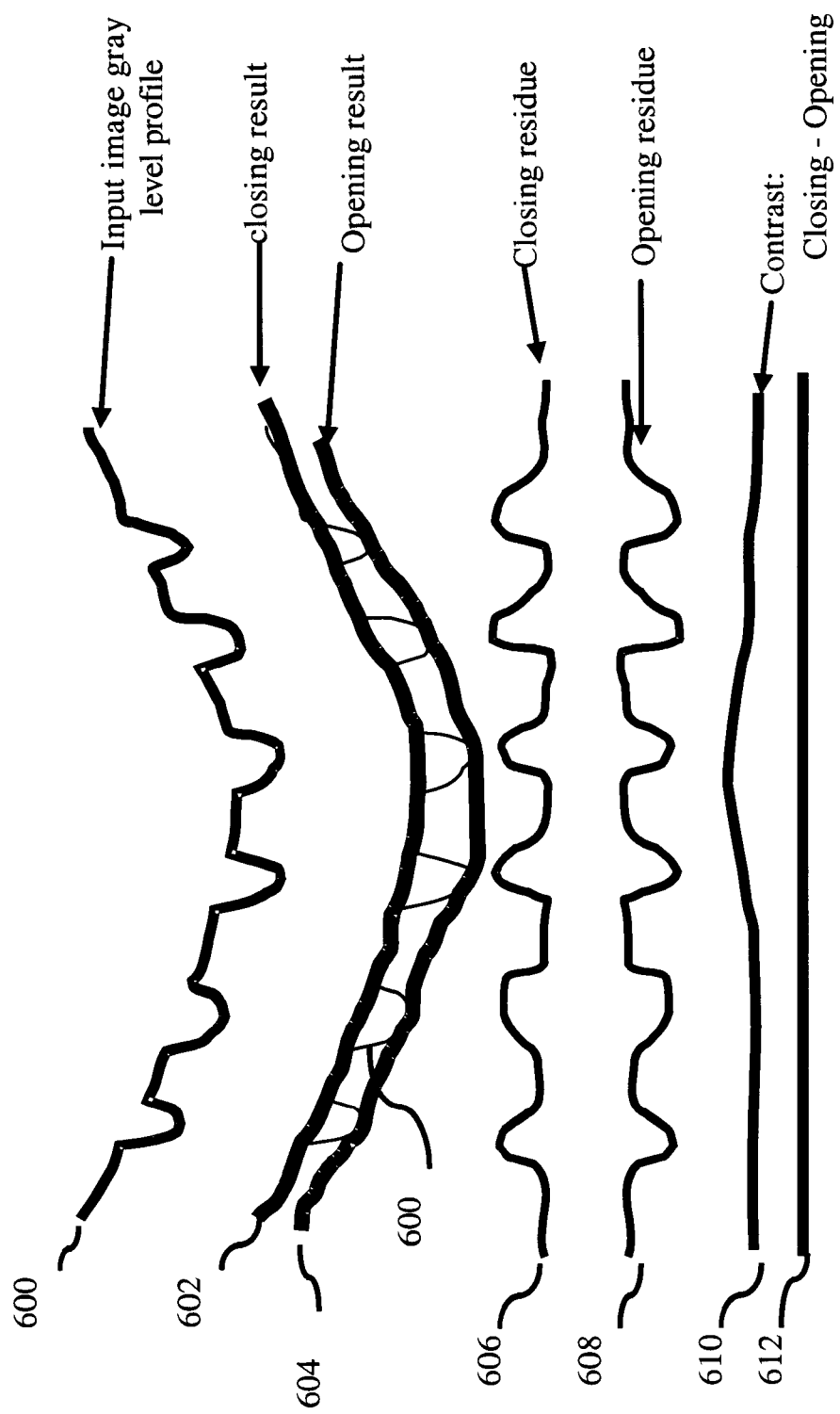
FIG. 6 shows an example of line/region detection and contrast extraction.

Bright Line/region Extraction:

In the preferred embodiment, bright lines/regions are extracted by a grayscale opening residue processing sequence defined as:

$$I-(I \circ A)$$

where $\circ$ is the grayscale morphological opening operation. FIG. 6 illustrates a grayscale opening residue operation applied to a one-dimensional image profile 600. In FIG. 6 the opening of image I, 600, by a sufficiently large structuring element produces result 604. The opening residue result 608 obtained from the input image gray level profile 600 demonstrates that grayscale morphological line/region detection does not introduce undesired phase shift or blurry effect.

Dark line/region extraction

Dark lines/regions can be extracted by a grayscale closing residue processing sequence defined as:

$$(I \bullet A)-I$$

where $\bullet$ is the grayscale morphological closing operation. In FIG. 6 the closing of image I, 600, by a sufficiently large structuring element produces result 602. The grayscale morphological closing residue result 606 obtained from the input image gray level profile 600 demonstrates that grayscale morphological line/region detection does not introduce undesired phase shift or blurry effect.

Region contrast extraction

In one preferred embodiment of the invention, region contrast is extracted by the difference of grayscale closing and opening operations on the input image 600. The processing sequence is defined as:

$$(I \bullet A)-(I \circ A)$$

In FIG. 6 a large structuring element A is assumed. A is assumed to be larger than the irregularities shown in the input image 600 and therefore produces the gray scale opening result 604 and the gray scale closing result 602 that is illustrated. The difference between these grayscale closing and opening results 610 is a measure of regional image contrast. A reference for the contrast result 610 is shown in 612. The morphological region contrast extraction result 610 does not exhibit any undesired phase shift or blurry effect.

Region Boundary Extraction:

Since two sides of a line are also edges, edge extraction operations will extract lines as well as edges. When using the same structure element, the edge extraction results, (bright edge extraction, dark edge extraction and general edge extraction disclosures), include the corresponding line/region extraction results (bright line/region extraction, dark line/region extraction, and region contrast extraction disclosures). A region boundary consists of only edges that are in the boundaries of large regions and excludes edges from narrow lines.

In the preferred embodiment, a bright region boundary is the difference between grayscale morphological opening and erosion:

$$I \circ A - I \ominus A$$

Similarly, a dark region boundary is the difference between grayscale morphological dilation and closing:

$$I \oplus A - I \bullet A$$

And a general region boundary is the difference between the summation of grayscale morphological opening and dilation and the summation of grayscale morphological erosion and closing:

$$(I \circ A + I \oplus A)-(I \ominus A + I \bullet A).$$

II.2 Structure-guided Feature Extraction Processing Sequence

By chosen the proper structuring element for the feature extraction processing sequence, structure-guided feature extraction can be efficiently accomplished. In a preferred embodiment of this invention, features of different structures are extracted using directional elongated structuring elements. Directional elongated structuring elements have limited width in one of its dimensions. It can be efficiently implemented in a general-purpose computer using the methods taught in co-pending U.S. Patent Applications entitled "U.S. patent application Ser. No. 09/693,723, "Image Processing System with Enhanced Processing and Memory Management", by Shih-Jong J. Lee et. al, filed Oct. 20, 2000 and U.S. patent application Ser. No. 09/692,948, "High Speed Image Processing Apparatus Using a Cascade of Elongated Filters Programmed in a Computer", by Shih-Jong J. Lee et. al., filed Oct. 20, 2000. The direction of the elongated structuring element is chosen to be approximately orthogonal to the primary direction of the features to be extracted. The process works even if the input edge is slightly rotated.

Figure 7:
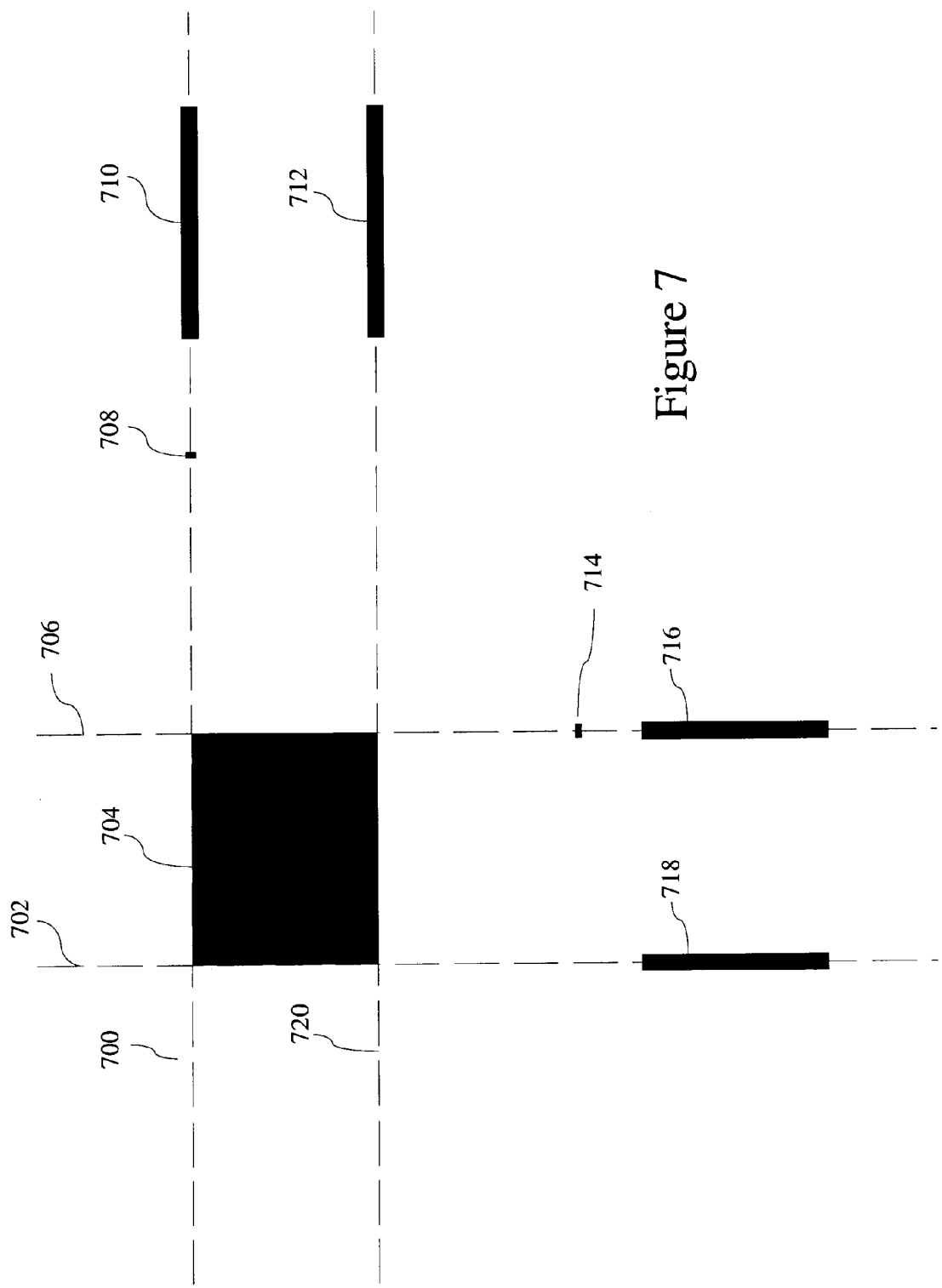
FIG. 7 shows examples of structure-guided general edge extraction that extracts vertical edges and horizontal edges using different directional elongated structuring elements.

FIG. 7 shows two structure-guided general edge extraction examples. One example extracts horizontal edges (co-linear with 700 and 720) from an input step edge image 704. A second example extracts vertical edges (co-linear with 702 and 706) from an input step edge image 704 using directional elongated structuring elements 708, 714. To extract vertical edges a horizontal elongated structuring element 714 is used. The general edge extraction processing sequence (difference between grayscale dilation and erosion) is applied and the vertical edges are extracted using structuring element 714 to produce result 718, 716. Similarly, a vertical elongated structuring element 708 is used for horizontal edge extraction to produce result 710, 712. In these examples, the width of the directional elongated structuring element (714 or 708) is one pixel and the length of the structuring element determines the width of the extracted edges 710, 712 and 718, 716. Note that the medial axes of the extracted edge lines correspond to the position of the input step edge (702, 706 and 700, 720) and no phase shift or blurry effect is introduced in the process.

FIG. 8 shows two examples of the preferred embodiment for structure-guided line extraction from an example rectangular line image 804. The first example extracts horizontal lines (co-linear with 800, 820) and another example extracts vertical lines (co-linear with 802 and 806) using a directional elongated structuring element 814. Similarly, a vertical elongated structuring element 808 is used for horizontal line extraction. In these examples, the width of either directional elongated structuring element 808, 814 is one pixel and the length of the directional elongated structuring element is longer than the width of the extracted lines. Structure-guided feature extraction allows the separate extraction of features of interest defined by their structures and irrelevant features are ignored or removed. For example, if only the horizontal edges are of interest, they can be easily extracted using structuring element 708 and no vertical edge components are included in the result.

Those skilled in the art should recognize that the extraction of features from any direction can be accomplished with the structure-guided feature extraction approach of this invention and features extracted from multiple directions can be combined by a union (maximum) of multiple directional features or intersection (minimum) of different directional features (to detect corner points, for example). Furthermore, two-dimensional structuring elements of different size and shape can be used to extract desired regions.

III. Structure-guided Image Feature Enhancement

The extracted image features could be noisy and could contain irrelevant information. The structure-guided image feature enhancement system of this invention efficiently enhances image features of interest and removes noisy and irrelevant information. In one embodiment of this invention, the structure-guided image feature enhancement is accomplished by an increasing idempotent (Serra, J, "Image analysis and mathematical morphology," London: Academic, pp318–321, 1982.) processing sequence such as grayscale morphological opening and closing operations applied alternatively to image foreground and background. Morphological opening and closing operations possess an increasing property that maintains inclusion relationships on the images they are applied to. If an inclusion relationship exists for structuring elements A and B, that is:

$$A \subset B,$$

then combinations of opening and closing have the following properties:

$$(((I \bullet A) \circ A) \bullet B) \circ B \subset (I \bullet B) \circ B$$

$$(((I \circ A) \bullet A) \circ B) \bullet B \supset (I \circ B) \bullet B$$

Figures 9A, 9B, 9C:
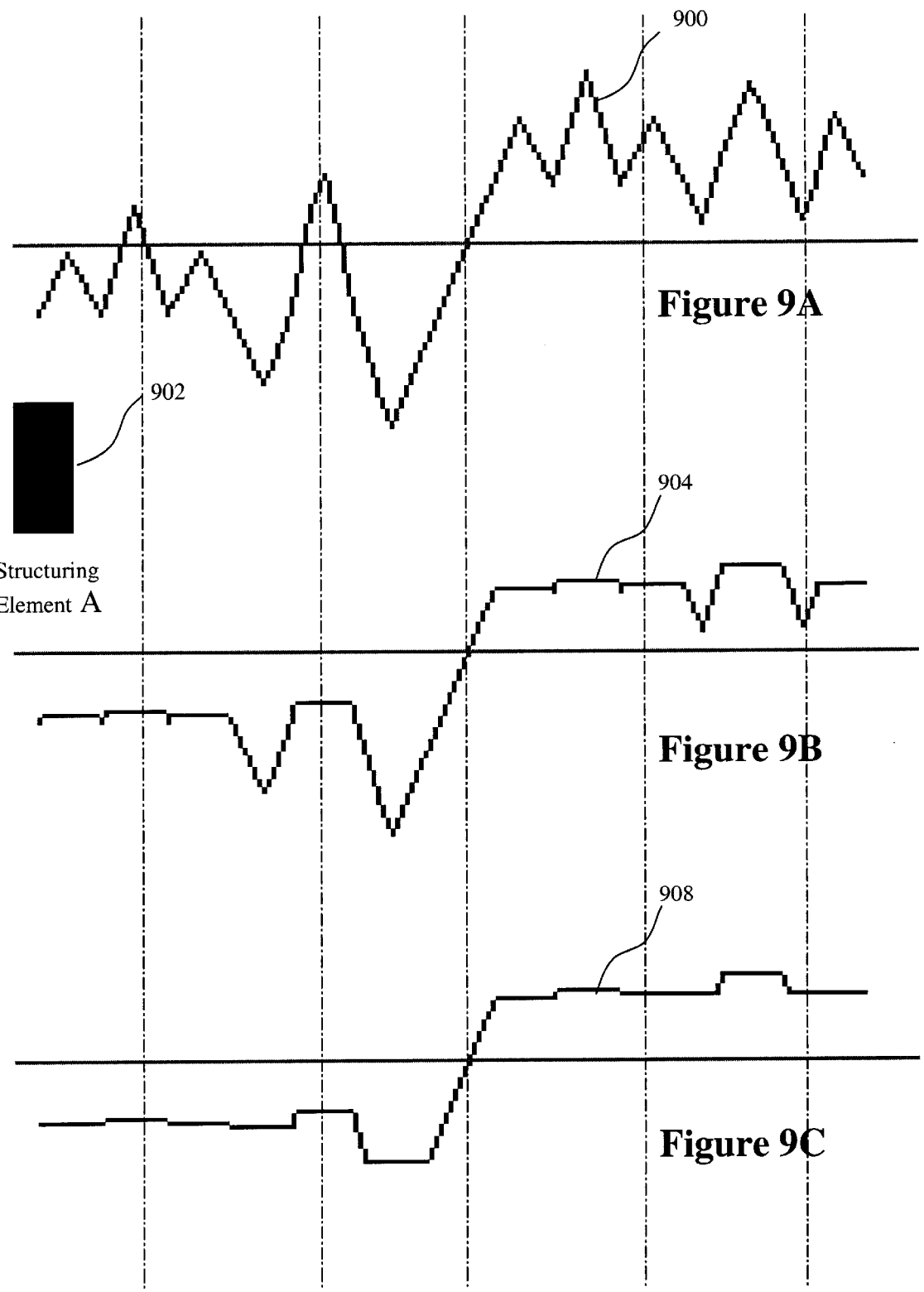
FIG. 9A shows an input noisy edge intensity profile
FIG. 9B shows the result of opening the noisy input image of 9A using structuring element A
FIG. 9C shows the result of a closing operation using structuring element A on the result shown in FIG. 9B to produce a new result.
Figures 11A, 11B, 11C:
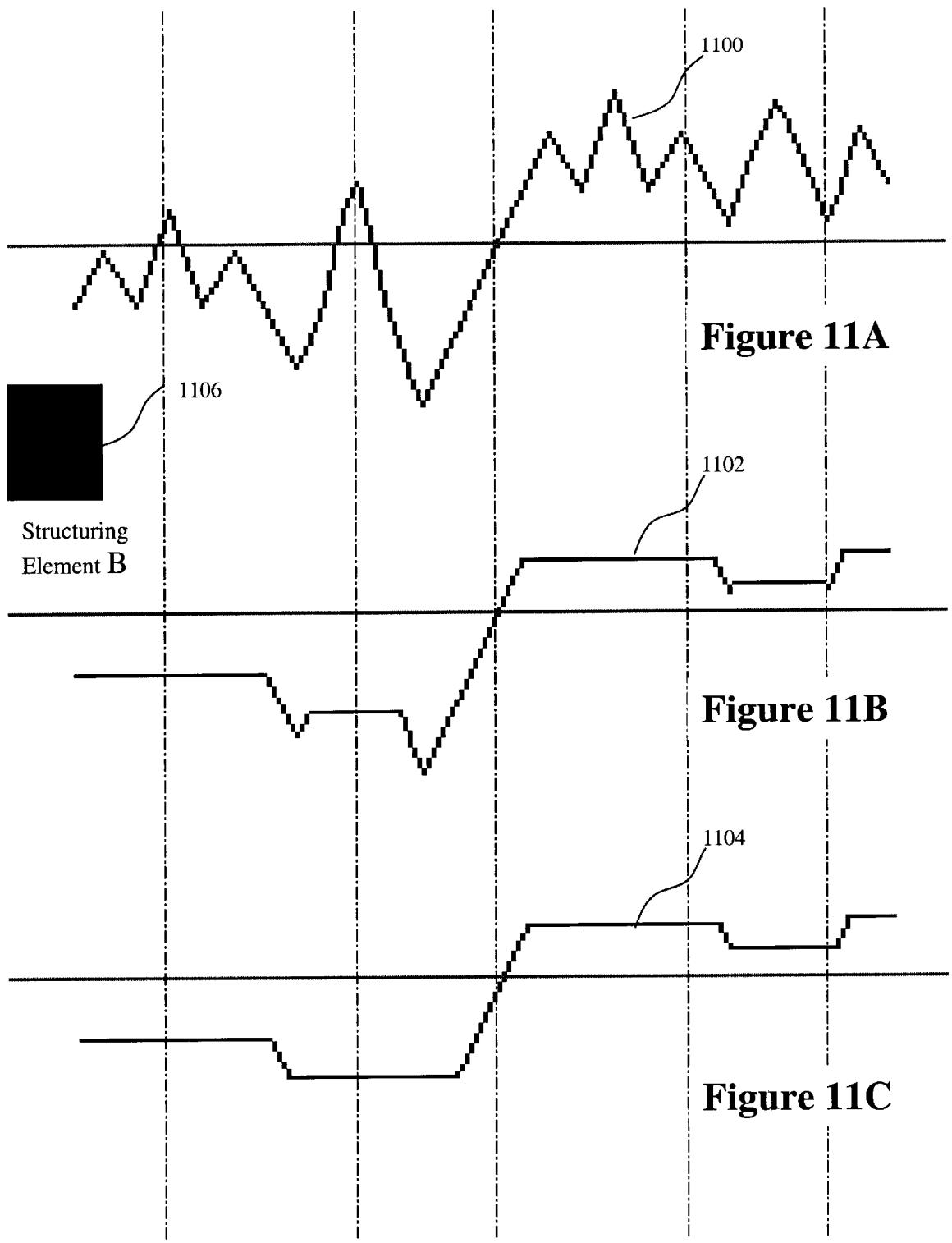
FIG. 11A shows the same input noisy edge intensity profile as FIG. 9A
FIG. 11B shows the result of opening the noisy input image of 11A using structuring element B
FIG. 11C shows the result of a closing operation using structuring element B on the result shown in FIG. 11B to produce a new result

This means that processing sequences that progressively apply combinations of openings and closings are less severe and introduce less distortion when a small structuring element is used before a larger one. In the preferred embodiment, application domain structure information is used in selecting the size and shape of structuring elements to achieve structure-guided enhancement using an increasing idempotent processing sequence. FIGS. 9A, 9B, 9C, 9D, 9E illustrate an indempotent structure-guided feature enhancement processing sequence on a noisy edge intensity profile 900. Structuring elements A 902 and B 912 chosen such that A C B, are used for the processing. FIG. 9B illustrates the effect of opening using structuring element A 902 producing result 904. FIG. 9C shows the same structuring element A 902 used in a closing operation on the initial result 904 to produce result 908. FIG. 9D illustrates the effect of further opening using structuring element B on result 908 to produce a new result 914. Finally, the structuring element B is applied once again for closing 914 to produce a result 918 shown in FIG. 9E. FIG. 11A repeats the noisy edge intensity profile 900 as 1100. To illustrate the inclusion relationship taught above, the structuring element B was used to open 1100 to produce result 1102 shown in FIG. 11B. The same structuring element B 1106 was then used to open 1102 to produce result 1104 shown in FIG. 11C. The feature enhancement process removes noise and preserves the structure of the features of interest. Using small structuring elements before larger structuring elements minimizes distortion. There is little blur, ringing, overshoot or pre-shoot normally caused by phase distortion of linear filtering.

By choosing the structuring elements according to the purposes known for the application, structure-guided feature enhancement is accomplished. In one embodiment of this invention, features of different structures are enhanced using directional elongated structuring elements. Directional elongated structuring elements are described in a co-pending U.S. patent application Ser. No. 09/693,723 entitled, "Image Processing System with Enhanced Processing and Memory Management", by Shih-Jong J. Lee et. al, filed Oct. 20, 2000 and U.S. patent application Ser. No. 09/692,948, "High Speed Image Processing Apparatus Using a Cascade of Elongated Filters Programmed in a Computer", by Shih-Jong J. Lee et. al., filed Oct. 20, 2000 both of which are incorporated in their entirety herein. The direction of the structuring element is chosen to align with the primary direction of the features to be enhanced. The largest size of the structuring element in the idempotent processing sequence should be smaller than the smallest size of features to be enhanced.

Those skilled in the art should recognize that the structure-guided feature enhancement process could start with grayscale opening followed by grayscale closing or start with grayscale closing followed by opening. Opening first will enhance dark features and closing first will enhance bright features. Each opening and closing iteration could use the same size structuring element for detailed feature refinement or could use an increased size structuring element for more aggressive feature refinement. Elongated structuring elements of orthogonal directions could be alternatively or sequentially applied in the enhancement processing sequence for multiple direction feature enhancement.

IV. Mask Generation

Figure 10:
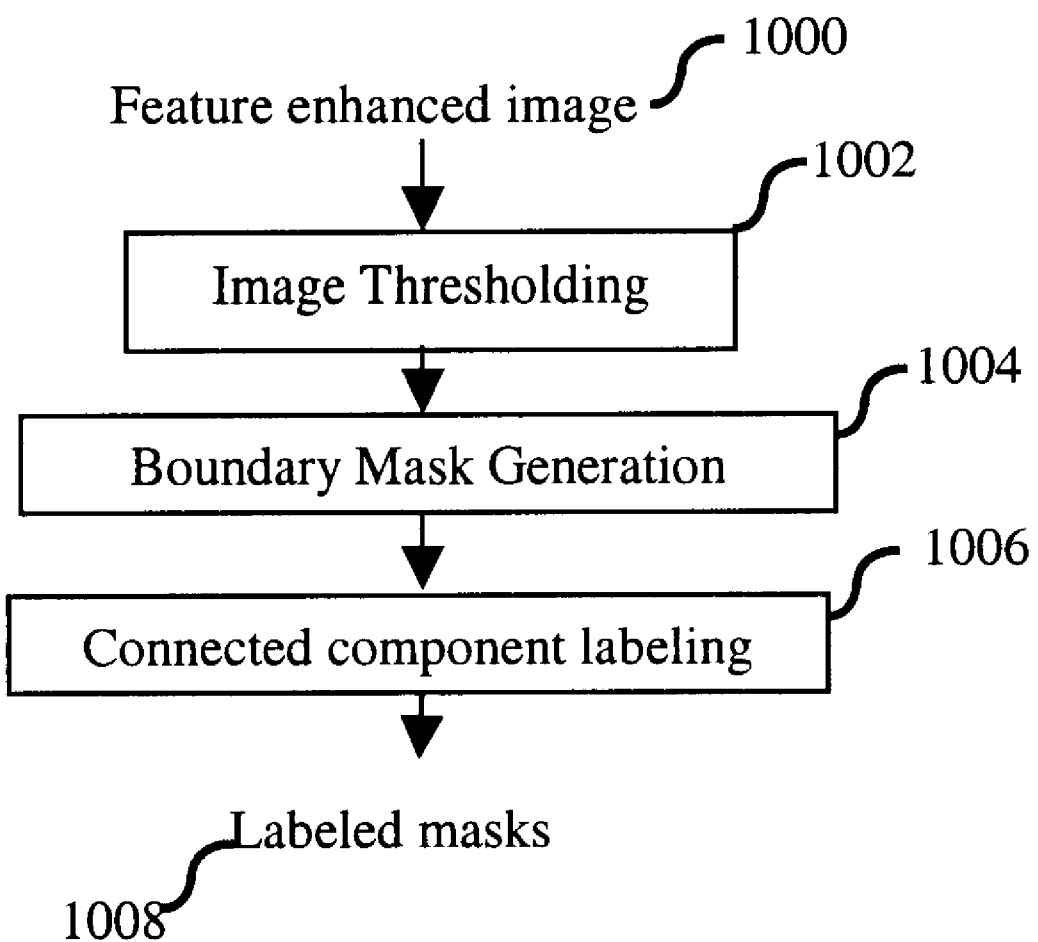
FIG. 10 shows the mask generation processing steps

In the preferred embodiment the mask generation stage 110, 208 of structure-guided image processing and image feature enhancement generates masks containing features of interest and assigns a unique label for each connected component of the mask image to be used in follow-on grayscale processing (image compression, image highlight display, image measurement, and detection 209). For either embodiment, the mask generation processing steps are shown in FIG. 10. An image thresholding step 1002 is applied to the feature enhanced image 1000 to generate binary gray level masks of the object regions of interest. If the measurement of an object boundary is desired, boundary masks are generated 1004. In one embodiment of the invention, boundary masks are generated using a general edge detection method derived from the difference of binary dilation and erosion. A connected component labeling step 1006 (ref: U.S. patent application Ser. No. 09/702,629, "Run-Length Based Image Processing Programmed in a Computer", by Shih-Jong J. Lee, filed Oct. 31, 2000) is applied to the boundary masks to assign a unique label 1008 for each connected component of the mask image.

The purpose of the generated masks is to provide rough regions of interest for applying fine grayscale detection or measurement. As long as the grayscale images are carefully prepared, high accuracy and repeatability of the binary masks are not necessary. The image thresholding step can therefore use a pre-defined threshold value. For applications with significant variations, an adaptive histogram thresholding method can be used to account for the image-to-image variation. In the preferred embodiment the adaptive histogram thresholding method assumes that an image histogram contains a mixture of two Gaussian populations and determines the threshold value from the histogram that yields the best separation between two populations divided by the threshold value (ref.: Otsu N, "A Threshold Selection Method for Gray-level Histograms," IEEE Trans. System Man and Cybernetics, vol. SMC-9, No. 1, January 1979, pp 62–66). Since the feature enhanced image 108 or 207 has already removed ambiguous or irrelevant information and noise, the mixture of two Gaussian histograms assumption yields useful results even when the Gaussian assumption is not strictly correct.

V. Weight Generation

In the preferred embodiment, the weight generation stage 120, or 216 generates a weight image 118, 212 that forms the basis for image compression, image highlight display, grayscale structure-guided estimation and measurement or detection 209. The grayscale feature enhanced image 108, 207 could be used directly as the weight image for the estimation if the enhanced features are the subjects of measurement or detection. If boundaries of the features are the subjects of estimation, a boundary weight image is derived by applying the general edge extraction method to the feature enhanced image. As this invention teaches, in one embodiment of this invention, the difference of grayscale dilation and erosion is used for general edge detection. According to the estimation or measurement desired, the masked image area is weighted with a feature enhanced image. The weights allow gray level control of portions of the image according to the importance they represent to the estimation or measurement.

VI. Application Domain Structure Information

The application domain structure information can be derived from Computer Aided Design (CAD) data that specifies its components as entities (LINE, POINT, 3DFACE, 3DPOLYLINE, 3DVERTEX, LINE, POINT, 3DFACE, 3DPOLYLINE, 3DVERTEX, etc.) and blocks (related components) of entities. The CAD data can be imported from different formats such as IGES, DXF, DMIS, NC files, Gerber and Excellon. There are many tools to automatically display CAD data for easy viewing. Alternatively, the application domain structure information such as the directions of features and their spatial relationship such as parallel groups, co-linear groups, intersection angles, etc. can be specified by users.

In a preferred embodiment, the structure information is derived from CAD data and used to process the input image 100, 200 through use of a sequence of structuring elements of different size and shape according to the methods described herein.

The weight image output 118 and mask image output 112 are particularly useful for image measurement or detection as described in the co-pending U.S. Patent Application entitled, "Structure-Guided Image Measurement System" by Shih-Jong J. Lee et. al., submitted Dec. 15, 2000 which is incorporated in its entirety herein.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A structure-guided image feature enhancement system comprising:
   a. an input image;
   b. a plurality of structuring elements selected according to feature structures to be enhanced;
   c. order the plurality of structuring elements by increasing size;
   d. an increasing idempotent processing sequence operates on the input image to enhance features using the ordered plurality of structuring elements.

2. The system of claim 1 wherein the plurality of structuring elements includes directional elongated structuring elements.

3. The system of claim 1 wherein the idempotent processing sequence includes morphological opening followed by closing operations.

4. The system of claim 1 wherein the idempotent processing sequence includes morphological closing followed by opening operations.

5. A structure-guided image processing system comprising:
   a. a structure-guided image feature enhancement module having an image input and having a feature enhanced image output, wherein the feature enhancement module uses idempotent processing;
   b. a mask generation module that is connected to the enhanced image output having a mask image output;
   c. a weight generation module connected to the structure guided image feature enhancement output having a weight image output.

6. A structure-guided image processing system comprising:
   a. a structure-guided image feature enhancement module having an image input and having a feature enhanced image output, wherein the feature enhancement module uses nonlinear filtering methods;
   b. a mask generation module that is connected to the enhanced image output having a mask image output;
   c. a weight generation module connected to the structure guided image feature enhancement output having a weight image output.

7. A structure-guided image processing system comprising:
   a. a structure-guided image feature enhancement module having an image input and having a feature enhanced image output;
   b. a mask generation module that is connected to the enhanced image output having a mask image output, wherein the mask generation module further comprises:
      i. an image thresholding module;
      ii. a connected component labeling module
   c. a weight generation module connected to the structure guided image feature enhancement output having a weight image output.

* * * * *